Figure 15:
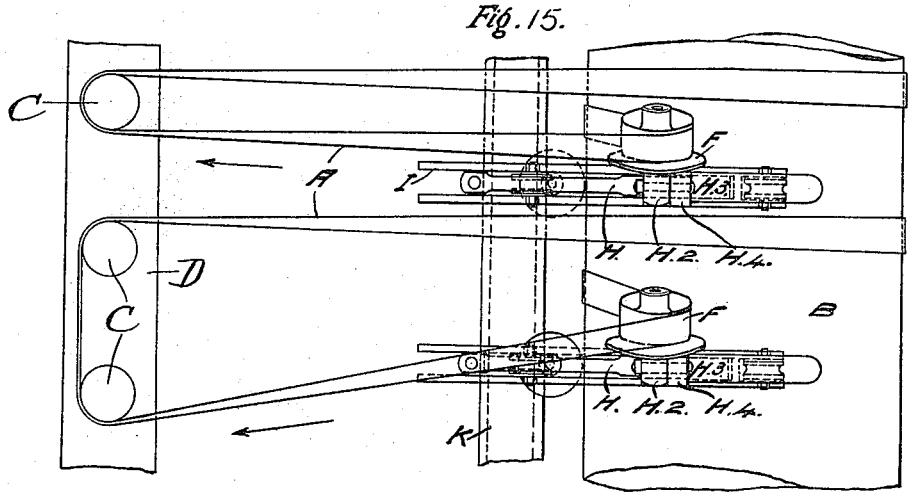

J. BOYD.
TENSIONING DEVICE.
APPLICATION FILED JAN. 23, 1915.
1,164,165.
Patented Dec. 14, 1915.
10 SHEETS—SHEET 1.
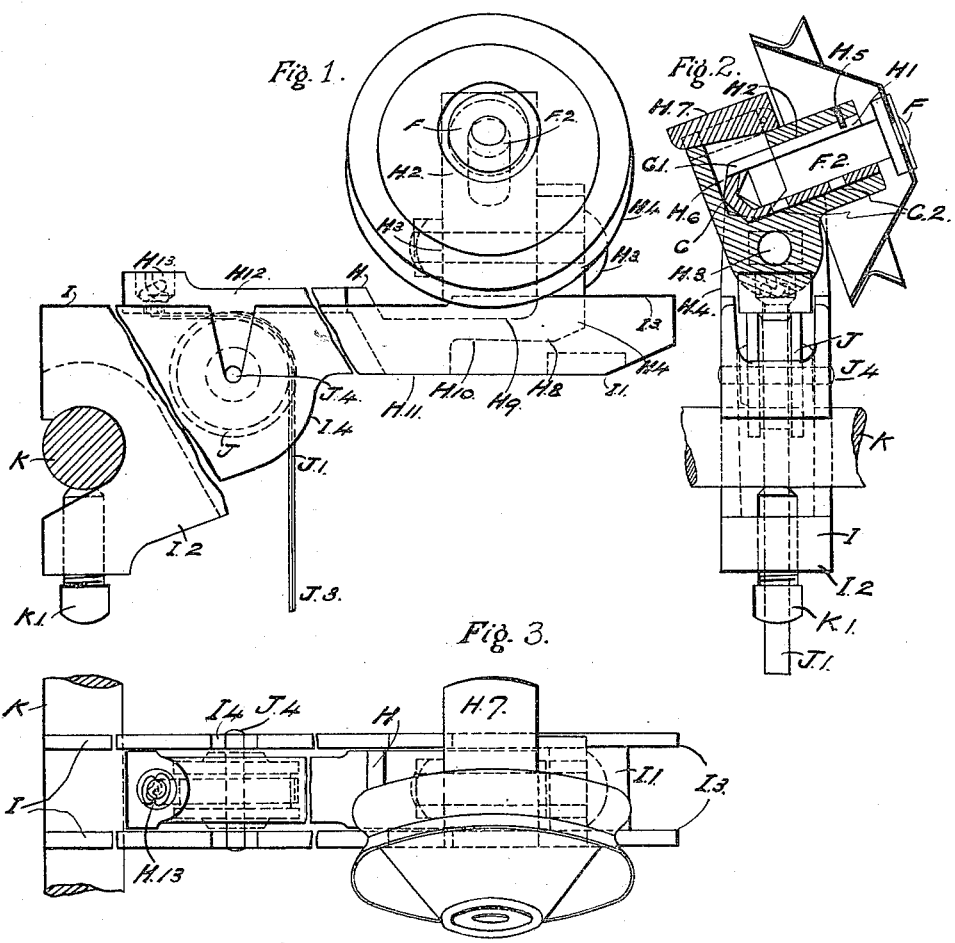
WITNESSES:
INVENTOR
John Boyd,
BY
ATTY

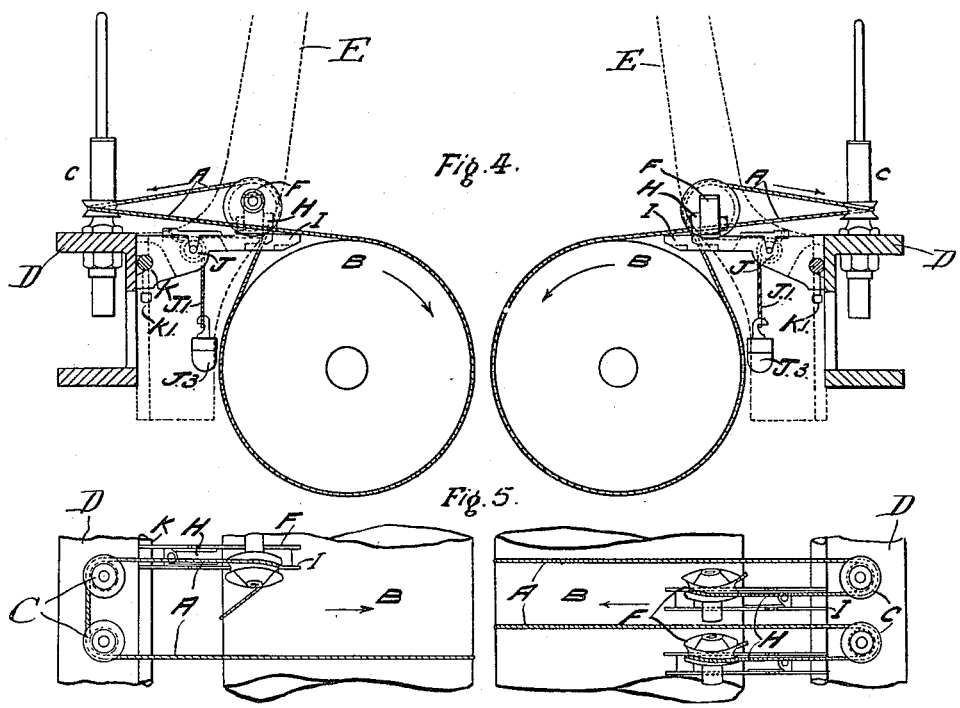

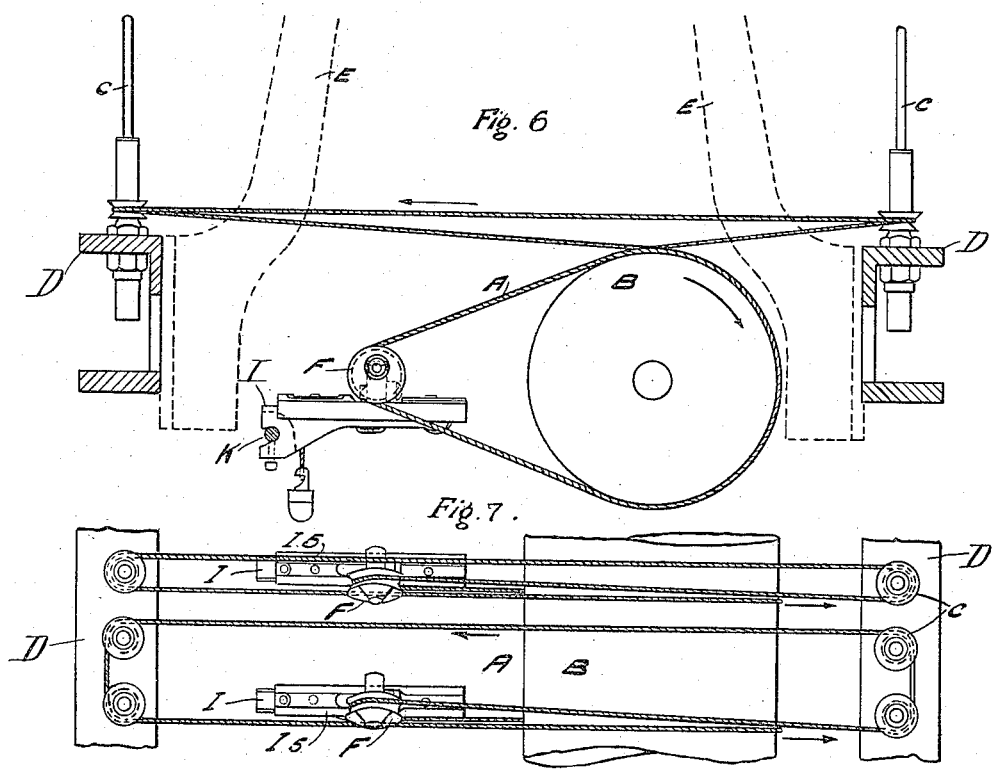

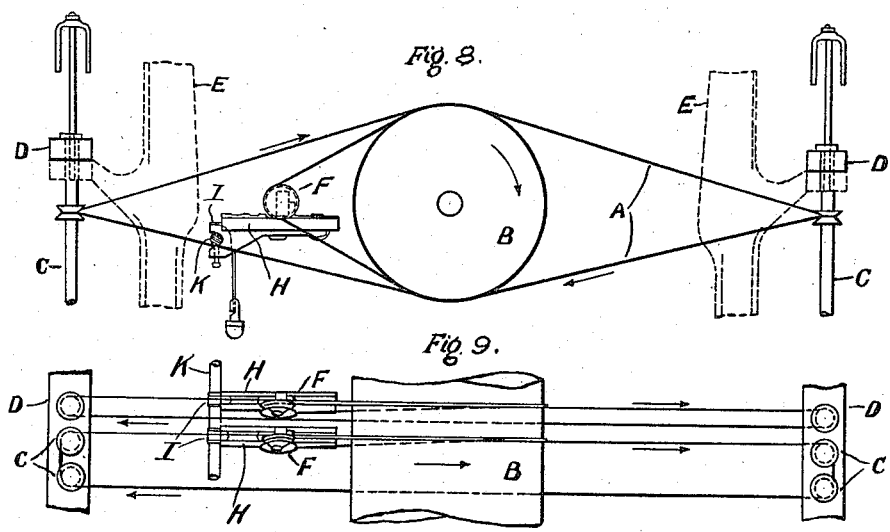

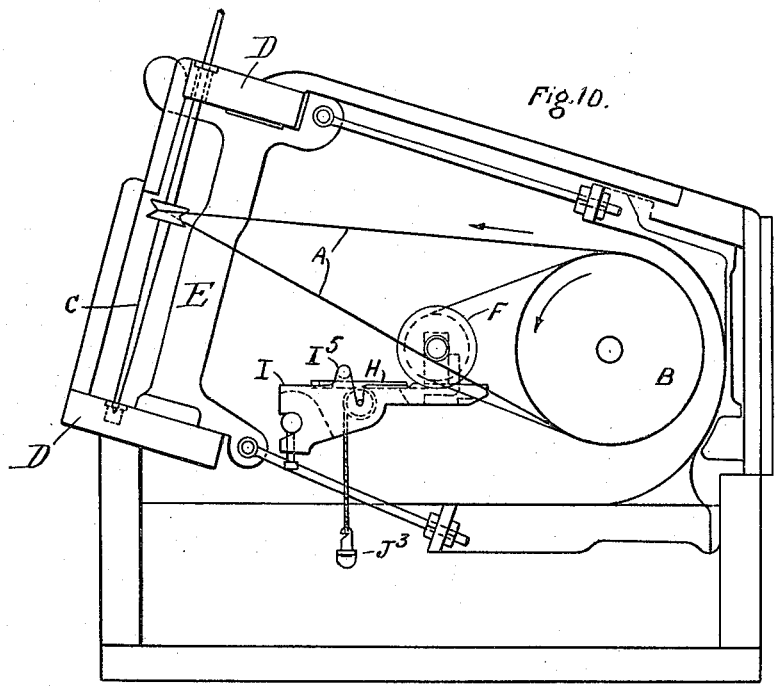
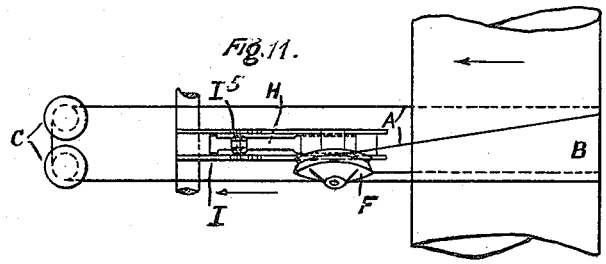

J. BOYD.
TENSIONING DEVICE.
APPLICATION FILED JAN. 23, 1915.
1,164,165.
Patented Dec. 14, 1915.
10 SHEETS—SHEET 6.
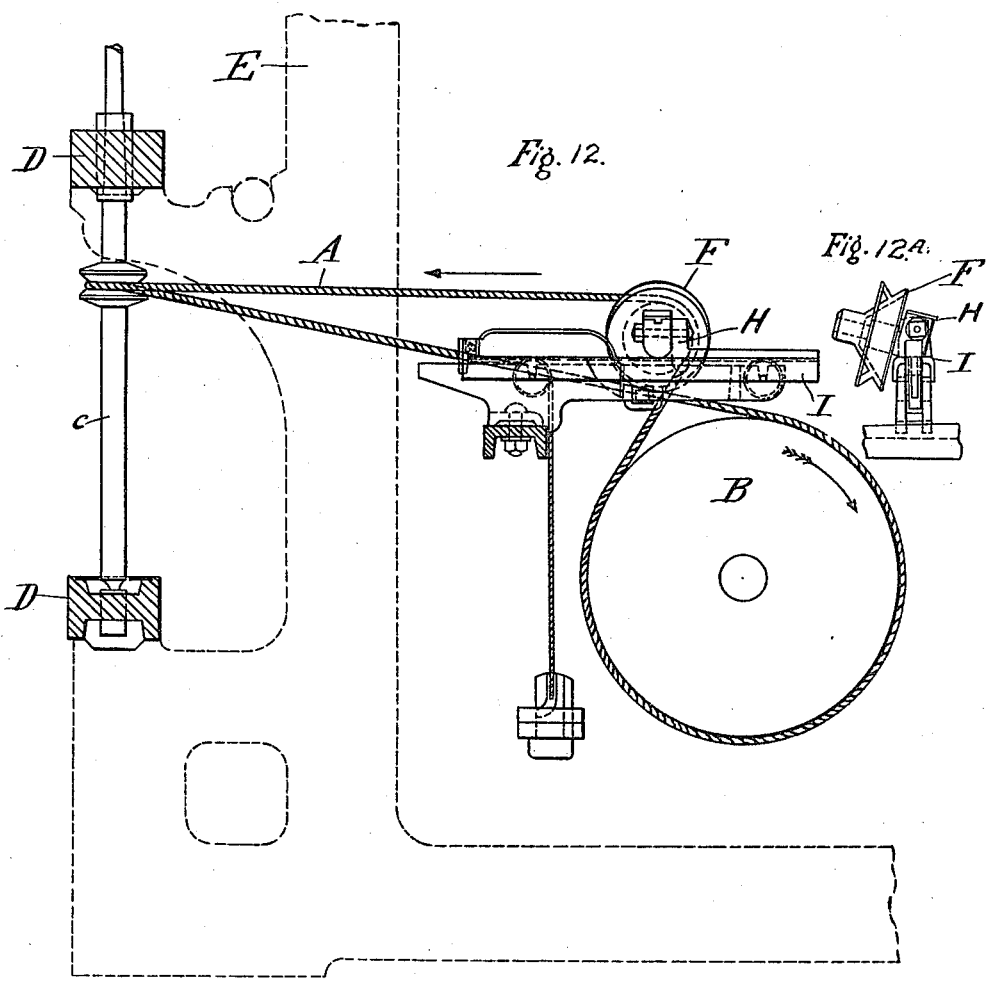

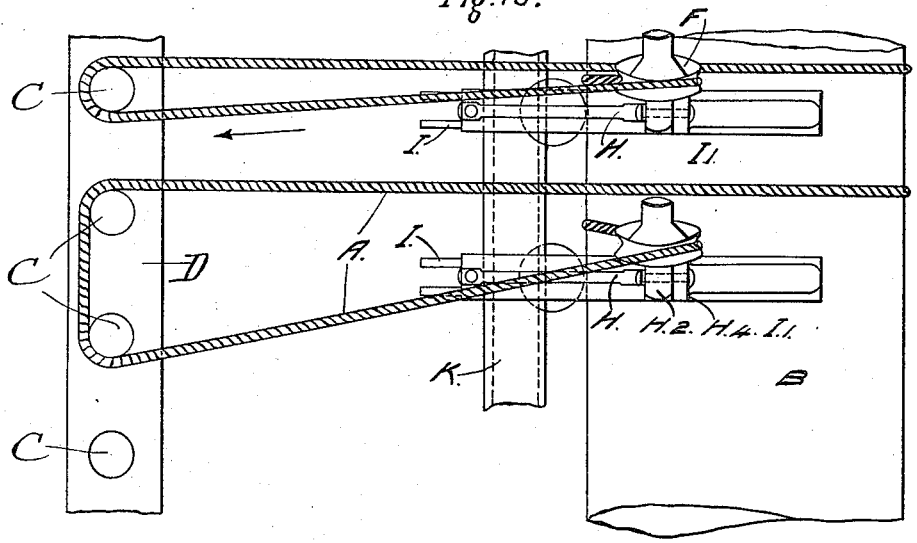

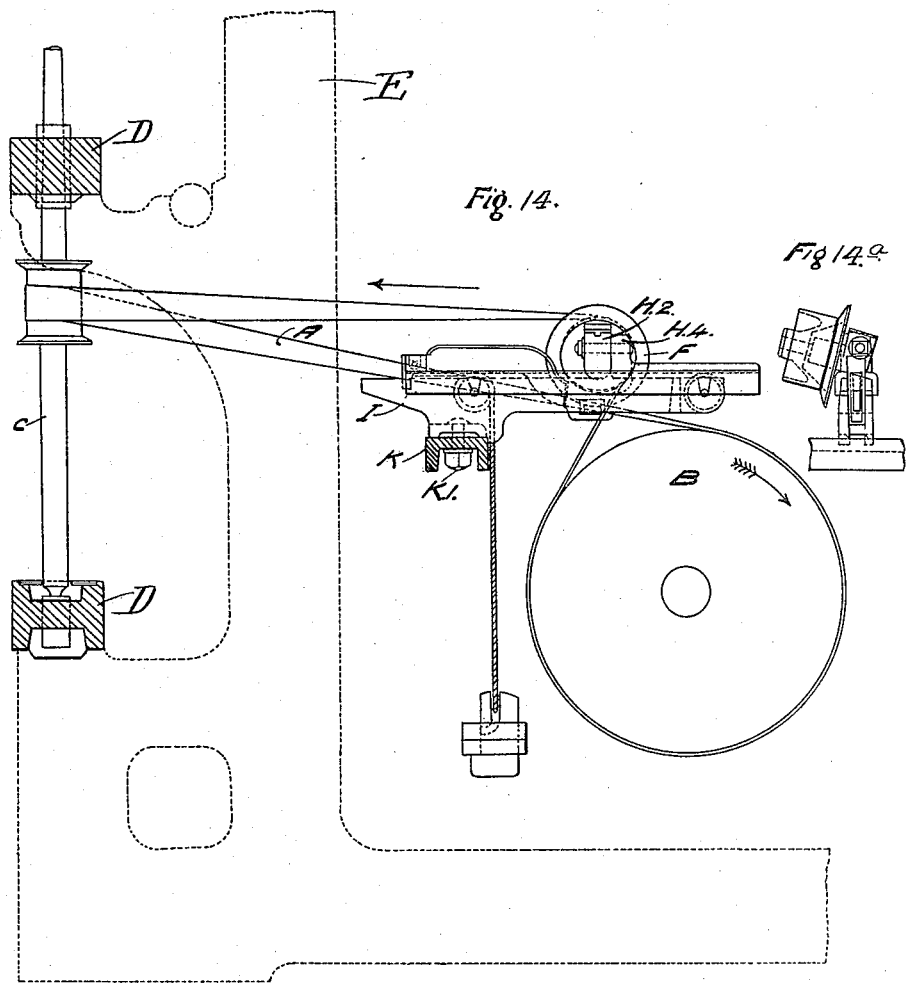

J. BOYD.
TENSIONING DEVICE.
APPLICATION FILED JAN. 23, 1915.

1,164,165.

Patented Dec. 14, 1915.
10 SHEETS—SHEET 9.

WITNESSES:
Hugh F. Keegan
Hubert H. Reddy

INVENTOR
John Boyd,
BY
Mercer & Blondell
ATTY

J. BOYD.
TENSIONING DEVICE.
APPLICATION FILED JAN. 23, 1915.
1,164,165. Patented Dec. 14, 1915.
10 SHEETS—SHEET 10.
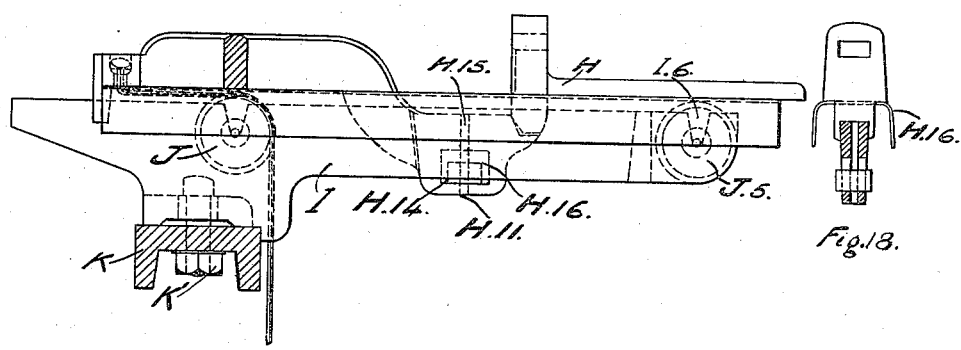
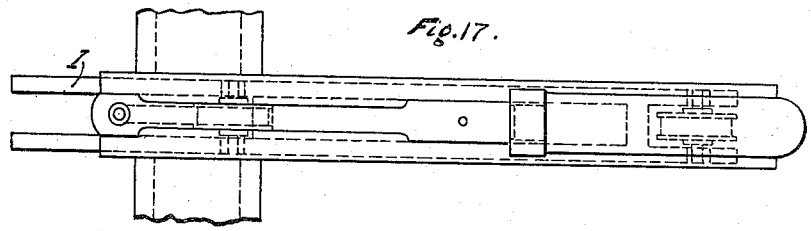

UNITED STATES PATENT OFFICE.

JOHN BOYD, OF SHETTLESTON, GLASGOW, SCOTLAND.

TENSIONING DEVICE.

1,164,165. Specification of Letters Patent. Patented Dec. 14, 1915.

Application filed January 23, 1915. Serial No. 4,033.

*To all whom it may concern:*

Be it known that I, JOHN BOYD, a subject of the King of the United Kingdom of Great Britain and Ireland, and residing at Shettleston, Glasgow, Scotland, have invented a certain new and useful Improvement in Tensioning Devices, of which the following is a specification.

This invention relates to spinning, twisting, winding or similar frames for fibrous materials, for example, to ring and flier frames equipped with spindles driven by bands on one side or both sides of a driving cylinder or cylinders, and also to mules used for spinning or twisting.

The invention provides for improved tensioning means of the type including a pulley revolving in a socket supported by a carriage that travels on a carrying bracket; said tensioning means serving to regulate separately the tension of individual spindle-driving bands used with such frames or mules, when each band is used for driving one, two or more spindles, so that every spindle of every frame may be driven with the necessary and as nearly as possible with an equal amount of driving power and consequently at its proper speed.

The invention is illustrated by way of example in the accompanying drawings in which—

Figures 1, 2, and 3 are respectively broken end, front section and broken plan views of the tensioning pulley and its adjuncts when, for the purpose of retaining its oil and for other reasons, its spindle is carried in an oblique position. These figures also show one construction of tensioning carriage and associated carrying bracket and adjuncts, as shown applied in Figs. 4 and 5, which latter are end and plan views showing so much of a cotton ring twisting frame as is necessary to illustrate the use of the improved spindle band tensioning apparatus for regulating separately the tension of individual bands serving to drive one or two spindles on one side only of each of two driving cylinders when the tops of both the cylinders are lower than the spindle band pulleys on both sides. Figs. 6 and 7 are end and plan views respectively of a similar ring twisting frame showing the use of another construction of the improved tensioning device as shown best in Figs. 16, 17, and 18, for regulating separately the tension of individual bands serving to drive one or two spindles on both sides of a driving cylinder when the top of the latter is lower than the spindle band pulleys on both sides. Figs. 8 and 9 are an end and a plan view respectively of as much of a wet linen spinning frame as is necessary to show the use of the improved tensioning device for regulating separately the tension of individual bands serving to drive one or two spindles on both sides of a central driving cylinder when the axis of the latter is in the same horizontal plane (or nearly in the same horizontal plane) as the spindle band pulleys on both sides: Figs. 10 and 11 are an end and a plan view respectively of as much of a spinning or twisting mule as is necessary to show the use of the improved tensioning device for regulating the tension of individual bands serving to drive one or two spindles in front of a driving cylinder: Figs. 12 and 13 and Figs. 14 and 15 are end and plan views respectively of as much of jute and flax spinning frames as is necessary to show the use of the improved tensioning device for regulating the tension of individual bands serving to drive one or two spindles on one side only of a driving cylinder, the first for tensioning cord bands and the second for tensioning tape bands. Figs. 12$^a$ and 14$^a$ are detail views to be read in conjunction with Figs. 12 and 14, respectively. Fig. 16 is an elevation, Fig. 17 a plan, and Fig. 18 a transverse section to a larger scale showing the construction of tensioning carriage and associated carrying brackets and their adjuncts shown applied in Figs. 6, 7, 8 and 9 and also in Figs. 12 to 15.

The same reference characters denote similar parts in the several views.

As usual, all the spinning and twisting frames here referred to, as shown in Figs. 4 to 15, are equipped with spindle driving bands A, a spindle driving cylinder or cylinders B, spindles C, and spindle rails D, the latter being supported by frame gables E.

In the adaptation of the improved tensioning pulley F and its adjuncts the live spindle $F^2$ revolves in an internal oil cup socket G, made as shown in Fig. 2, with an upturned longitudinal lubricating slit $G^1$ and under oil holes $G^2$ communicating with, and carried in, an oil tight cavity $H^1$. The cavity $H^1$ is formed in an obliquely arranged swiveling block $H^2$ pivoted on a bolt $H^3$ and secured thereby to an upturned part $H^4$ of the tensioning carriage H, a pin $H^5$ in the block $H^2$ being used to keep the socket G in its upturned position. The oblique swiveling block or tensioning-pulley-holding-part $H^2$ is made with an upper cavity $H^6$ containing lubricant for lubricating the spindle $F^2$ and supplying the oil cup socket G; and, to protect the latter from dust, the cavity $H^6$ may be provided with a hinged cover $H^7$. The block $H^2$ may be turned to the right or to the left and set and secured along with its tensioning pulley F at any angle to suit the run of the spindle band A. To allow the spindle band A to run clear of the carriage H and the adjustable carrying bracket I, by which it is carried and guided and on which it travels, both the carriage and bracket are made as narrow as possible, but the carrying bracket I, which is slotted from end to end—its two sides being only united at one end by a bridge $I^1$ and at its other end by a holding part $I^2$—is made deep enough to prevent the carriage from tilting too much either to the right or to the left. With this object also the upturned part $H^4$ of the carriage H, which in some cases rests and slides on the inner top end $I^3$ of the carrying bracket I, has its under part $H^8$ reduced in breadth so as to work easily between the two sides of the carrying bracket I. The carriage H is made with its top surface $H^9$ at a lower level than the upturned end and low enough to make room for the oblique swiveling block $H^2$; the under part $H^{10}$ of the same is made to clear the top of the bridge $I^1$ of the carrying bracket I; and a still lower part $H^{11}$ is provided to steady the carriage H, and to prevent it from tilting too much in the narrow carrying bracket I. The part $H^{11}$ also stops the inward travel of the carriage H when it comes in contact with the bridge part $I^1$ of the carrying bracket I. The front part $H^{12}$ of the tensioning carriage H is also made narrow enough to work easily between the sides of the carrying bracket I and high enough to rest on the top of a grooved weight cord pulley J on or above the weight cord or cords, thus forming a partial cover for said pulley J—reducing the sliding friction of the tensioning carriage and thereby rendering it more sensitive for the work it has to perform. In order still more to reduce the sliding friction of the carriage H, in some cases when it can be used as shown in Figs. 6, 7, 8 and 9 and also in Figs. 12 to 18, the inner end of the carriage is made longer so as to rest on the top of a second anti-friction roller or pulley $J^5$ carried at the inner end of the carrying bracket I, while a third anti-friction roller $H^{14}$ affords a lateral bearing for the carriage. As shown in Fig. 1, the outer end of the tensioning carriage H is made with a recessed hole $H^{13}$. From the latter a flat tape $J^1$ is carried in its groove over the weight cord pulley J to an adjustable suspended weight or weights when the pull of the tensioning pulley requires to be inward. The weight cord pulley J is carried on its spindle $J^4$ in two open gabs $I^4$ of the adjustable carrying bracket I. When the second anti-friction pulley $J^5$ is used, it also may be carried on its spindle in two open gabs $I^6$ of the adjustable carrying bracket I. As best shown in Fig. 16, the third anti-friction roller $H^{14}$ revolves with or on a vertical spindle $H^{15}$ in the aperture $H^{16}$ made for it in the lower part $H^{11}$ of the tensioning carriage. The under part of the carriage H coming in contact with the pulley J limits its outward travel; it being understood, however, that the carriage H has sufficient movement on its carrying bracket I to allow for any possible stretching of the band A as long as it lasts. The particular construction of tensioning carriage H and its adjustable carrying bracket I and the adjuncts herein described has the advantage that it is very compact and inexpensive to manufacture, and also that its several parts can be easily adjusted to drive right or left twist spindles of any pitch.

Referring to Figs. 4 and 5, each tensioning device is carried on a longitudinal round rod K, and secured thereto by a set screw $K^1$. Each band A, when driving, passes around one or two spindles C, around the back of the driving cylinder B, then upward in front of the latter and over the tensioning pulley F so that it may act on the sag or slack part of the band A, before it returns to its spindle or spindles C. In this case the pull of the tensioning pulley F, regulated by the adjustable cord weight or weights $J^3$, is inward toward the cylinder B. It will be seen that the down or side strain of the running spindle driving band A on the tensioning pulley F presses its internal spindle $F^2$ into the oil cup socket G, and also keeps the latter in its place in the cavity $H^1$ of the swiveling block $H^2$.

In the construction shown in Figs. 6 and 7, the pull of the tensioning pulley F is outward away from the cylinder B; the weight cord $J^1$ being connected to the middle of the carriage H, and passed around the front side of the weight cord pulley J.

In the constructions shown in Figs. 8 and 9, the improved tensioning device is arranged to regulate separately the tension of an individual spindle band A by which in wide pitch frames single spindles on each side of the frame may be driven, or, as shown in Fig. 9, two closely pitched spindles on each side of the frame may be driven by one band. In this case also the improved tensioning device may be placed to one side of the frame and its tensioning pulley F located preferably in the same horizontal plane as the axis of its driving cylinder B.

In the constructions shown in Figs. 10 and 11, the pull of the tensioning pulley F is outward away from the cylinder B and preferably in the same horizontal plane as the axis of the driving cylinder B. Each spindle band A is taken from its mule spindle or spindles C under and over the cylinder B and as it returns from the top of the latter is passed over the tensioning pulley F and again under and over the cylinder B back to its spindle or spindles C. In this case, i. e., in mule spinning or twisting, the tensioning pulley F acts on a loop of the band A as it comes from and returns to the cylinder B. The spindles of mules require to be banded in the manner indicated so that every time the mule carriage travels inward the spindles C may be reversed for the purpose of winding the yarn on to its cop after it is spun.

In the constructions shown in Figs. 12, 12$^a$, and 13, and Figs. 14, 14$^a$, and 15, the swiveling block H$^2$ is pivoted on its holding bolt H$^3$ by which it is secured to the upturned part H$^4$ of the tensioning carriage H.

In Figs. 16 to 19 the tensioning carriage is shown supported by two antifriction rollers or pulleys mounted on horizontal axes at the ends of the bracket, one of which rollers or pulleys is the weight cord pulley and the other of which is the pulley J$^5$ journaled in open gabs I$^6$. Either of these rollers may serve as the weight cord pulley. The third anti-friction roller H$^{14}$ revolving on its vertical spindle H$^{15}$ comes in contact with either of the faces of the slot formed in the carrying bracket I and so constitutes a lateral bearing for the carriage.

As best seen in Figs. 16, 17 and 18, when it is necessary to prevent fluff, dust or dirt from accumulating too much about the carrying bracket I, its anti-friction rollers J and J$^5$ and the front and back parts of the tensioning carriage H, and thereby hindering the free action of the apparatus, a curved longitudinal cover H$^{16}$ projecting downward on each side is secured to the underside of the tensioning carriage. As in the previous cases, the tensioning carriage is limited in its travel in both directions. The driving cylinder B is placed low enough to make room for the tensioning apparatus. The carrying bracket I is adjustably carried by a longitudinal suitably formed cast-iron rail K, and secured thereto by a bolt or set screw K$^1$.

I claim:—

1. The combination of a tensioning pulley having an internal spindle, a socket, in which the spindle revolves, a tensioning carriage, an adjustable block pivoted to said carriage said block formed with a lubricant-receiving cavity and capable of carrying said pulley in any required right or left oblique working position, and an open adjustable bracket on which the tensioning carriage can travel, as and for the purpose specified.

2. A tensioning device, comprising, in combination, a carriage, an oil-cup socket supported by said carriage, a tensioning pulley having a spindle received in said socket, a bracket relatively to which said carriage travels, a guide pulley fitted to said bracket, and a weight-carrying tension member led around said guide pulley, said pulley being so located that the carriage is supported above said bracket.

3. A tensioning device, comprising, in combination, a carriage, an oil-cup socket supported by said carriage, a tensioning pulley having its spindle received in said socket, a bracket in relation to which said carriage travels, roller supports for said carriage, and a cord connected to the carriage and led around one of said roller supports.

4. A tensioning device, comprising, in combination, an adjustable bracket, a weight cord pulley carried by said bracket, a carriage adapted to travel in relation to said bracket, a block fixed to said carriage, a tensioning pulley carried by said block, means for guiding said carriage in its traveling movements, and means including a weight cord pulley to limit the movements of the carriage in either direction.

5. A tensioning device, comprising, in combination, a carriage, an oil-cup socket supported by said carriage, a tensioning pulley having its spindle received in said socket, a bracket on which said carriage travels, two rollers mounted on horizontal axes serving to support and afford bearings for the ends of said carriage, and a roller revolving on a vertical axis affording a lateral bearing for said carriage.

6. A tensioning device, comprising, in combination, a carriage, an oil-cup socket supported by said carriage, a tensioning pulley having its spindle received in said socket, a bracket on which said carriage travels, two rollers mounted on horizontal axes serving to support and afford bearings for the ends of said carriage, a roller revolving on a vertical axis affording a lateral bearing for said carriage, and a cover member fitted to said carriage.

In testimony whereof I have signed my name to this specification in the presence of two subscribing witnesses.

JOHN BOYD.

Witnesses:
 JOHN BYDH,
 WILLIAM BOYD.

Copies of this patent may be obtained for five cents each, by addressing the "Commissioner of Patents, Washington, D. C."